(12) United States Patent
Elsayed et al.

(10) Patent No.: US 9,992,770 B2
(45) Date of Patent: *Jun. 5, 2018

(54) APPARATUS, SYSTEM, AND METHOD FOR PDCCH PREPARATION IN RADIO FREQUENCY CIRCUITRY

(71) Applicant: Apple Inc., Cupertino, CA (US)

(72) Inventors: Moustafa M. Elsayed, Los Gatos, CA (US); Tarik Tabet, Los Gatos, CA (US); Konstantinos Sarrigeorgidis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/380,949

(22) Filed: Dec. 15, 2016

(65) Prior Publication Data

US 2017/0099654 A1 Apr. 6, 2017

Related U.S. Application Data

(63) Continuation of application No. 14/531,646, filed on Nov. 3, 2014, now Pat. No. 9,560,588.

(51) Int. Cl.
*H04B 1/38* (2015.01)
*H04W 72/04* (2009.01)
*H04W 52/52* (2009.01)

(52) U.S. Cl.
CPC ......... *H04W 72/042* (2013.01); *H04W 52/52* (2013.01)

(58) Field of Classification Search
CPC ......... H04W 52/0209; H04W 52/0029; H04W 72/042

(Continued)

(56) References Cited

U.S. PATENT DOCUMENTS 6,473,607 B1 10/2002 Shohara et al.
6,633,759 B1 * 10/2003 Kobayashi .......... H04M 1/7253
455/418

(Continued)

FOREIGN PATENT DOCUMENTS

EP 2453710 A1 5/2012
WO 9627993 A1 9/1996
WO 2011002820 A1 1/2011

OTHER PUBLICATIONS

International Search Report and Written Opinion, Application No. PCT/US2015/054333, dated Dec. 16, 2015, 12 pages.

*Primary Examiner* — Raj Chakraborty
(74) *Attorney, Agent, or Firm* — Meyertons Hood Kivlin Kowert & Goetzel, P.C.; Jeffrey C. Hood; Joel L. Stevens

(57) ABSTRACT

An apparatus, system, and method for performing PDCCH preparation in RF circuitry are described. In one embodiment, power may be provided to a crystal oscillator to exit a first sleep state. One or more clocking signals may be provided to RF circuitry based on output from the crystal oscillator. Calibration and state restoration of the RF circuitry may be performed independent of baseband circuitry. A plurality of algorithms to prepare for receiving data form a wireless communication network may be performed independent of the baseband circuitry. After initiating the plurality of algorithms, state restoration of the baseband circuitry may be performed. Data may be received from a wireless communication network using the RF circuitry. The data may be processed using the baseband circuitry. State retention for the RF circuitry and the baseband circuitry may be performed. Finally, the crystal oscillator may be powered down to enter a second sleep state.

20 Claims, 10 Drawing Sheets

(58) Field of Classification Search
USPC .......................................................... 455/574
See application file for complete search history.

(56) References Cited

U.S. PATENT DOCUMENTS

| | | | |
|---|---|---|---|
| 8,488,506 B2 | 7/2013 | Husted et al. | |
| 2007/0054629 A1* | 3/2007 | Maligeorgos | H04B 1/30 455/88 |
| 2009/0168848 A1* | 7/2009 | Constantinidis | H04B 1/707 375/140 |
| 2009/0247223 A1 | 10/2009 | Yu et al. | |
| 2012/0052858 A1* | 3/2012 | Mohseni | H04W 52/0245 455/425 |
| 2014/0154985 A1* | 6/2014 | Sun | H04W 52/0209 455/41.2 |
| 2014/0169244 A1 | 6/2014 | Poliselly et al. | |
| 2014/0301262 A1 | 10/2014 | Homchaudhuri et al. | |
| 2015/0257201 A1* | 9/2015 | Su | H04W 76/048 455/552.1 |

* cited by examiner

APPARATUS, SYSTEM, AND METHOD FOR PDCCH PREPARATION IN RADIO FREQUENCY CIRCUITRY

PRIORITY CLAIM

This application is a continuation of Ser. No. 14/531,646 titled "Apparatus, System, and Method for PDCCH Preparation in Radio Frequency Circuitry" and filed Nov. 3, 2014, whose inventors are Moustafa M. Elsayed, Tarik Tabet, and Konstantinos Sarrigeorgidis and which is hereby incorporated by reference in its entirety as though fully and completely set forth herein.

FIELD OF THE INVENTION

The present application relates to wireless devices, and more particularly to an apparatus, system, and method for performing PDCCH preparation in radio frequency (RF) circuitry.

DESCRIPTION OF THE RELATED ART

Wireless communication systems are rapidly growing in usage. Further, wireless communication technology has evolved from voice-only communications to also include the transmission of data, such as Internet and multimedia content. A user equipment (UE) also generally provides other functionality, such as applications, that are desired by users. Accordingly, the large amount of functionality present in UEs, e.g., wireless devices such as cellular phones, can place a significant strain on the battery life of the UE. Accordingly, improvements in wireless communication are desired.

SUMMARY OF THE INVENTION

Embodiments described herein relate to an apparatus, system, and method for performing PDCCH preparation in radio frequency (RF) circuitry.

In one embodiment, a method may be performed at a user equipment device (UE) comprising wireless communication circuitry having radio frequency (RF) circuitry and baseband circuitry. The method may include providing power to a crystal oscillator to exit a first sleep state. The method may further include providing one or more clocking signals to the RF circuitry based on output from the crystal oscillator. The method may further include performing calibration and state restoration of the RF circuitry independent of the baseband circuitry. The method may further include initiating and performing a plurality of algorithms to prepare for receiving data from a wireless communication network, where the initiating and performing is performed by the RF circuitry independent of the baseband circuitry. After initiating the plurality of algorithms, the method may include performing state restoration of the baseband circuitry. The method may include receiving data from a wireless communication network using the RF circuitry. The method may include processing the data using the baseband circuitry. The method may include performing state retention for the RF circuitry and the baseband circuitry. The method may further include powering down the crystal oscillator to enter a second sleep state.

In one embodiment, a user equipment device (UE), may include a crystal oscillator. The UE may also include radio frequency (RF) circuitry coupled to the crystal oscillator. The RF circuitry may include a microprocessor, a nonvolatile memory, and a volatile memory. The UE may include baseband circuitry coupled to the RF circuitry and the crystal oscillator, where the baseband circuitry comprises a microprocessor. The UE is configured to provide power to a crystal oscillator to exit a first sleep state. The UE may further perform calibration and state restoration of the RF circuitry in response to providing power to the crystal oscillator. The calibration and state restoration of the RF circuitry may be controlled by the microprocessor of the RF circuitry. The UE may further initiate and perform a plurality of algorithms to prepare for receiving data from a wireless communication network. The initiating and performing may be performed by the RF circuitry is controlled by the microprocessor of the RF circuitry. After initiation of the plurality of algorithms, the UE may perform state restoration of the baseband circuitry, which may be controlled by the microprocessor of the baseband circuitry. The UE may receive the data from a wireless communication network using the RF circuitry and may process the data using the baseband circuitry.

In one embodiment, radio frequency (RF) circuitry may be configured for placement within a user equipment device (UE). The RF circuitry may include a microprocessor, non-volatile memory coupled to the microprocessor, and volatile memory coupled to the microprocessor. The non-volatile memory may be configured to store state information while in a sleep state while the volatile memory may be configured to store state information while in an active state. The RF circuitry may be configured to receive a reference signal from a crystal oscillator of the UE, after exiting a first sleep state. The RF circuitry may be further configured to perform calibration and state restoration of the RF circuitry in response to receiving the reference signal from the crystal oscillator. The RF circuitry may be further configured to perform a plurality of algorithms to prepare for receiving physical downlink control channel (PDCCH) information from a wireless communication network. The plurality of algorithms may be controlled by the microprocessor of the RF circuitry. The RF circuitry is further configured to receive the PDCCH information from a wireless communication network. Finally, the RF circuitry may be configured to perform state retention of the RF circuitry after receiving the PDCCH information from the wireless communication network. The state retention of the RF circuitry may be controlled by the microprocessor of the RF circuitry.

The techniques described herein may be implemented in and/or used with a number of different types of devices, including but not limited to cellular phones, portable media players, portable gaming devices, tablet computers, wearable computing devices, remote controls, wireless speakers, set top box devices, television systems, and computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

Figure 1:
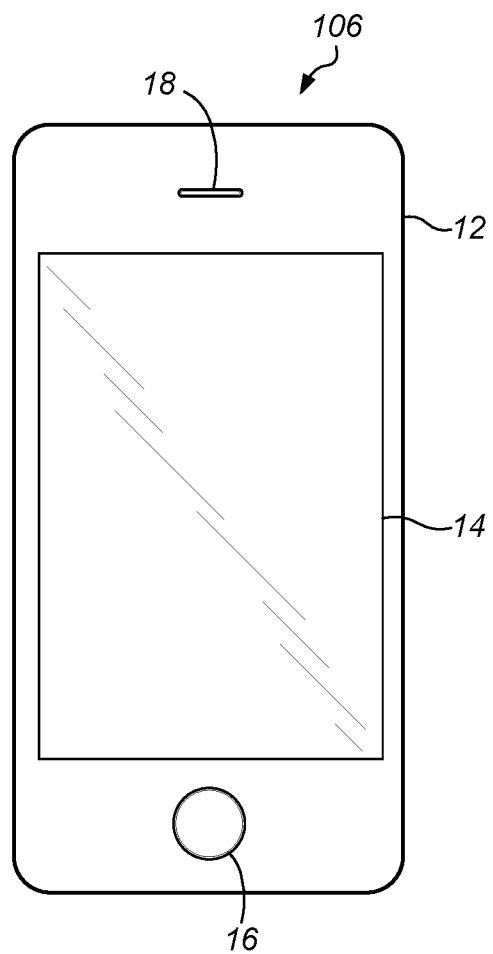
FIG. 1 illustrates an example user equipment (UE) according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
TDS: Time Division Synchronous Code Division Multiple Access
LTE: Long Term Evolution
RAT: Radio Access Technology
TX: Transmit
RX: Receive
AGC: Automatic Gain Control
TTL: Time Tracking Loop
FTL: Frequency Tracking Loop
CHEST: Channel Estimation Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—User Equipment

FIG. 1 illustrates an example user equipment (UE) 106 according to one embodiment. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1×RTT or other CDMA radio access technologies), Time Division Synchronous Code Division Multiple Access (TD-SCDMA or TDS), Long Term Evolution (LTE), Advanced LTE, and/or other RATs. For example, the UE 106 may support at three RATs, such as GSM, TDS, and LTE. Various different or other RATs may be supported as desired.

The UE 106 may comprise one or more antennas. The UE 106 may also comprise any of various radio configurations, such as various combinations of one or more transmitter chains (TX chains) and one or more receiver chains (RX chains). For example, the UE 106 may comprise a radio that supports two or more RATs. The radio may comprise a single TX (transmit) chain and a single RX (receive) chain. Alternatively, the radio may comprise a single TX chain and two RX chains, e.g., that operate on the same frequency. In another embodiment, the UE 106 comprises two or more radios, i.e., two or more TX/RX chains (two or more TX chains and two or more RX chains).

The UE 106 may comprise two antennas which may be used to communicate using two or more RATs. For example, the UE 106 may have a pair of cellular telephone antennas coupled to a single radio or shared radio. The antennas may be coupled to the shared radio (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain. The first and second receiver chains may share a common local oscillator, which means that both of the first and second receiver chains tune to the same frequency. The first and second receiver chains may be referred to as the primary receiver chain (PRX) and the diversity receiver chain (DRX).

In one embodiment, the PRX and DRX receiver chains operate as a pair and time multiplex among two or more RATs, such as LTE and one or more other RATs such as GSM or CDMA1×. In the primary embodiment described herein the UE 106 comprises one transmitter chain and two receiver chains (PRX and DRX), wherein the transmitter chain and the two receiver chains (acting as a pair) time multiplex between two (or more) RATs, such as LTE and GSM.

Each antenna may receive a wide range of frequencies such as from 600 MHz up to 3 GHz. Thus, for example, the local oscillator of the PRX and DRX receiver chains may tune to a specific frequency such as an LTE frequency band, where the PRX receiver chain receives samples from antenna 1 and the DRX receiver chain receives samples from antenna 2, both on the same frequency (since they use the same local oscillator). The wireless circuitry in the UE 106 can be configured in real time depending on the desired mode of operation for the UE 106. In the example embodiment described herein, the UE 106 is configured to support LTE and GSM radio access technologies, although other combinations are also envisioned, such as LTE and CDMA.

Figure 2:
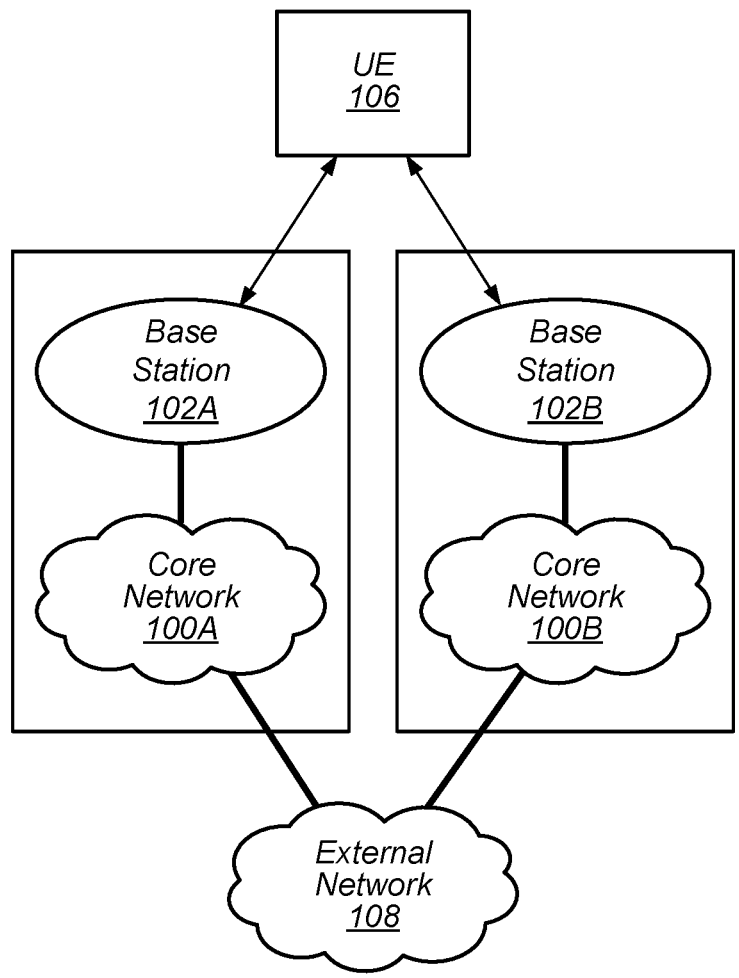
FIG. 2 illustrates an example wireless communication system where a UE communicates with two base stations using two different RATs.

FIG. 2—Communication System

FIG. 2 illustrates an exemplary (and simplified) wireless communication system. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA), TDS, LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, TDS, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and TDS, LTE and GSM and TDS, and/or any other combination of RATs) might be coupled to a network or service provider that also supports the different cellular communication technologies. In one embodiment, the UE 106 may be configured to use a first RAT that is a packet-switched technology (e.g., LTE) and a second RAT that is a circuit-switched technology (e.g., GSM or TDS).

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
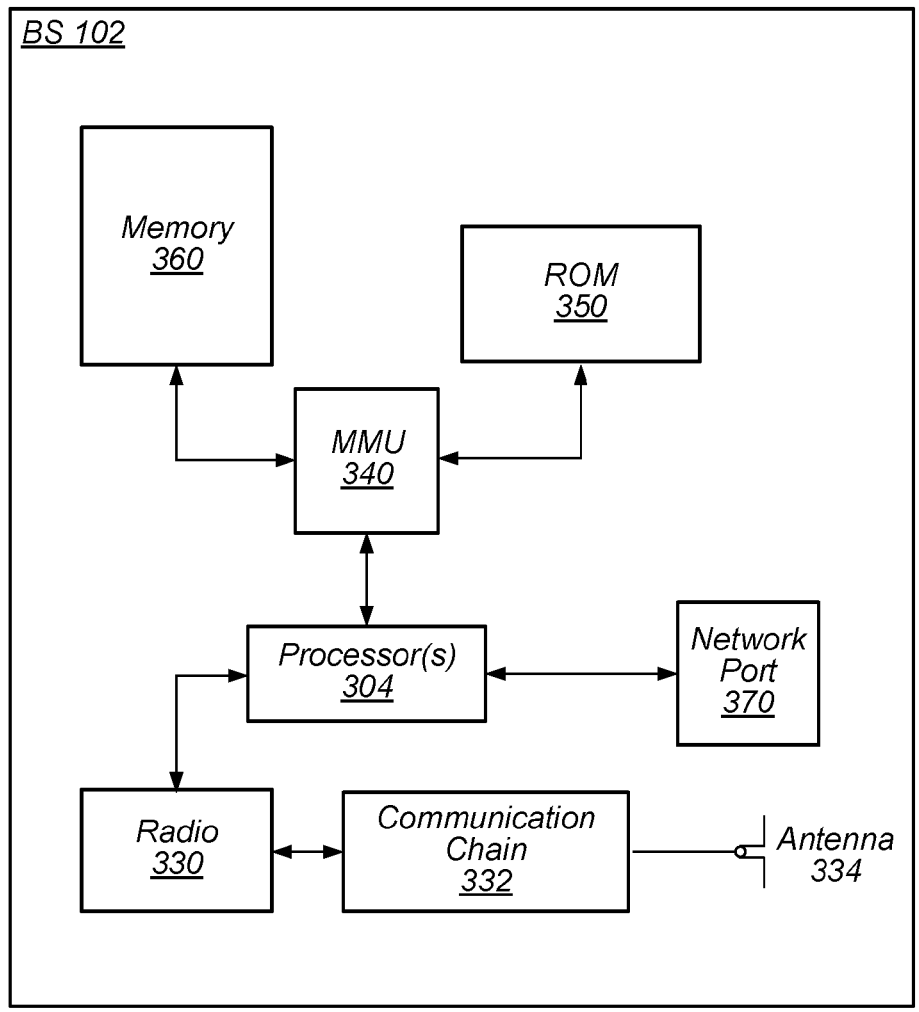
FIG. 3 is an example block diagram of a base station, according to one embodiment.

FIG. 3—Base Station

FIG. 3 illustrates an exemplary block diagram of a base station 102. It is noted that the base station of FIG. 3 is merely one example of a possible base station. As shown, the base station 102 may include processor(s) 304 which may execute program instructions for the base station 102. The processor(s) 304 may also be coupled to memory management unit (MMU) 540, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices 106 serviced by the cellular service provider).

The base station 102 may include at least one antenna 334. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various RATs, including, but not limited to, LTE, GSM, TDS, WCDMA, CDMA2000, etc.

The processor(s) 304 of the base station 102 may be configured to implement part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof.

Figure 4:
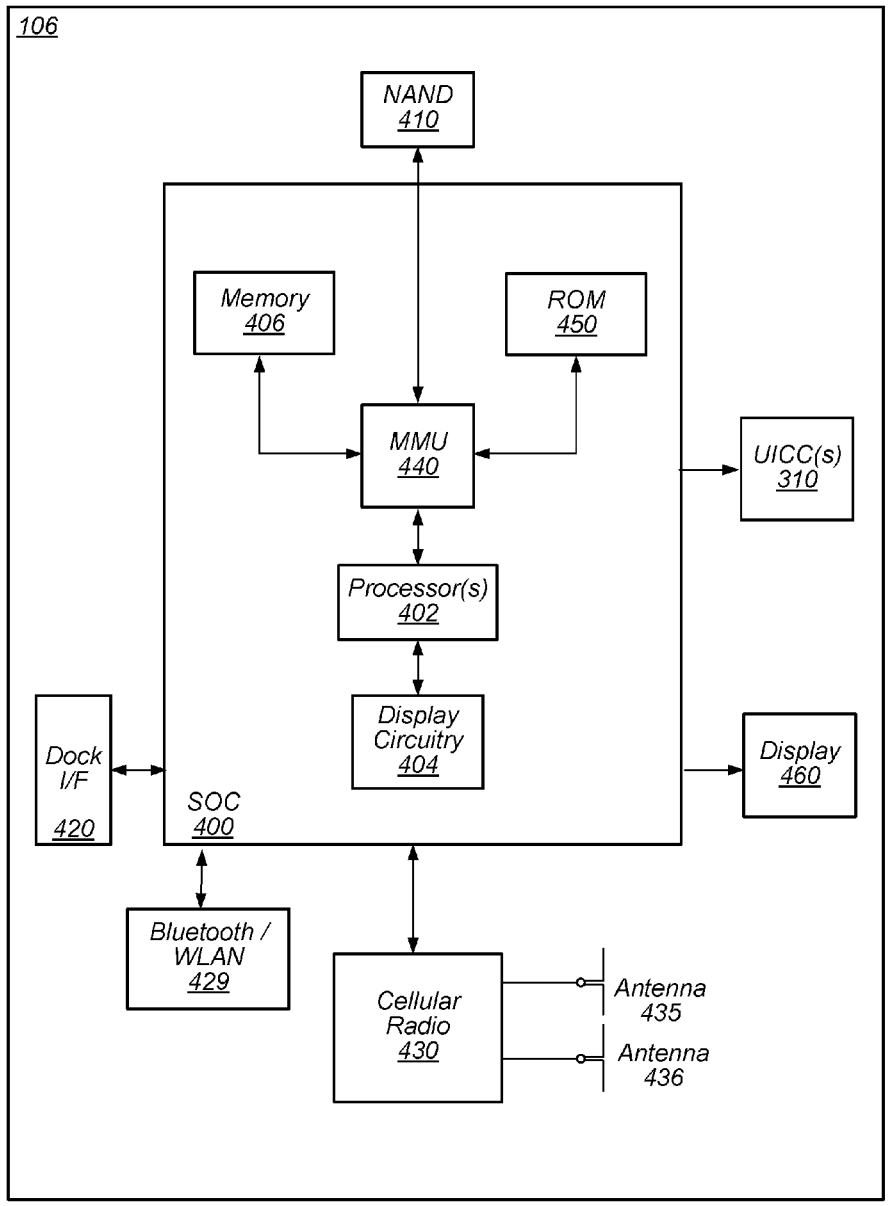
FIG. 4 is an example block diagram of a UE, according to one embodiment.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, TDS, CDMA, etc., and short range wireless communication circuitry 429 (e.g., Bluetooth and WLAN circuitry). The UE 106 may further comprise one or more smart cards 310 that comprise SIM (Subscriber Identity Module) functionality, such as one or more UICC(s) (Universal Integrated Circuit Card(s)) cards 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In one embodiment, as noted above, the UE 106 comprises at least one smart card 310, such as a UICC 310, which executes one or more Subscriber Identity Module (SIM) applications and/or otherwise implement SIM functionality. The at least one smart card 310 may be only a single smart card 310, or the UE 106 may comprise two or more smart cards 310. Each smart card 310 may be embedded, e.g., may be soldered onto a circuit board in the UE 106, or each smart card 310 may be implemented as a removable smart card. Thus the smart card(s) 310 may be one or more removable smart cards (such as UICC cards, which are sometimes referred to as "SIM cards"), and/or the smart card(s) 310 may be one or more embedded cards (such as embedded UICCs (eUICCs), which are sometimes referred to as "eSIMs" or "eSIM cards"). In some embodiments (such as when the smart card(s) 310 include an eUICC), one or more of the smart card(s) 310 may implement embedded SIM (eSIM) functionality; in such an embodiment, a single one of the smart card(s) 310 may execute multiple SIM applications. Each of the smart card(s) 310 may include components such as a processor and a memory; instructions for performing SIM/eSIM functionality may be stored in the memory and executed by the processor. In one embodiment, the UE 106 may comprise a combination of removable smart cards and fixed/non-removable smart cards (such as one or more eUICC cards that implement eSIM functionality), as desired. For example, the UE 106 may comprise two embedded smart cards 310, two removable smart cards 310, or a combination of one embedded smart card 310 and one removable smart card 310. Various other SIM configurations are also contemplated.

As noted above, in one embodiment, the UE 106 comprises two or more smart cards 310, each implementing SIM functionality. The inclusion of two or more SIM smart cards 310 in the UE 106 may allow the UE 106 to support two different telephone numbers and may allow the UE 106 to communicate on corresponding two or more respective networks. For example, a first smart card 310 may comprise SIM functionality to support a first RAT such as LTE, and a second smart card 310 may comprise SIM functionality to support a second RAT such as GSM or CDMA. Other implementations and RATs are of course possible. Where the UE 106 comprises two smart cards 310, the UE 106 may support Dual SIM Dual Active (DSDA) functionality. The DSDA functionality may allow the UE 106 to be simultaneously connected to two networks (e.g., and use two different RATs) at the same time. The DSDA functionality may also allow the UE 106 may to simultaneously receive voice calls or data traffic on either phone number. In another embodiment, the UE 106 supports Dual SIM Dual Standby (DSDS) functionality. The DSDS functionality may allow either of the two smart cards 310 in the UE 106 to be on standby waiting for a voice call and/or data connection. In DSDS, when a call/data is established on one SIM 310, the other SIM 310 is no longer active. In one embodiment, DSDx functionality (either DSDA or DSDS functionality) may be implemented with a single smart card (e.g., a eUICC) that executes multiple SIM applications for different carriers and/or RATs.

As noted above, the UE 106 may be configured to communicate wirelessly using multiple radio access technologies (RATs). As further noted above, in such instances, the cellular communication circuitry (radio(s)) 430 may include radio components which are shared between multiple RATS and/or radio components which are configured exclusively for use according to a single RAT. Where the UE 106 comprises at least two antennas, the antennas 435 and 436 may be configurable for implementing MIMO (multiple input multiple output) communication.

As described herein, the UE 106 may include hardware and software components for implementing features for communicating using two or more RATs, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
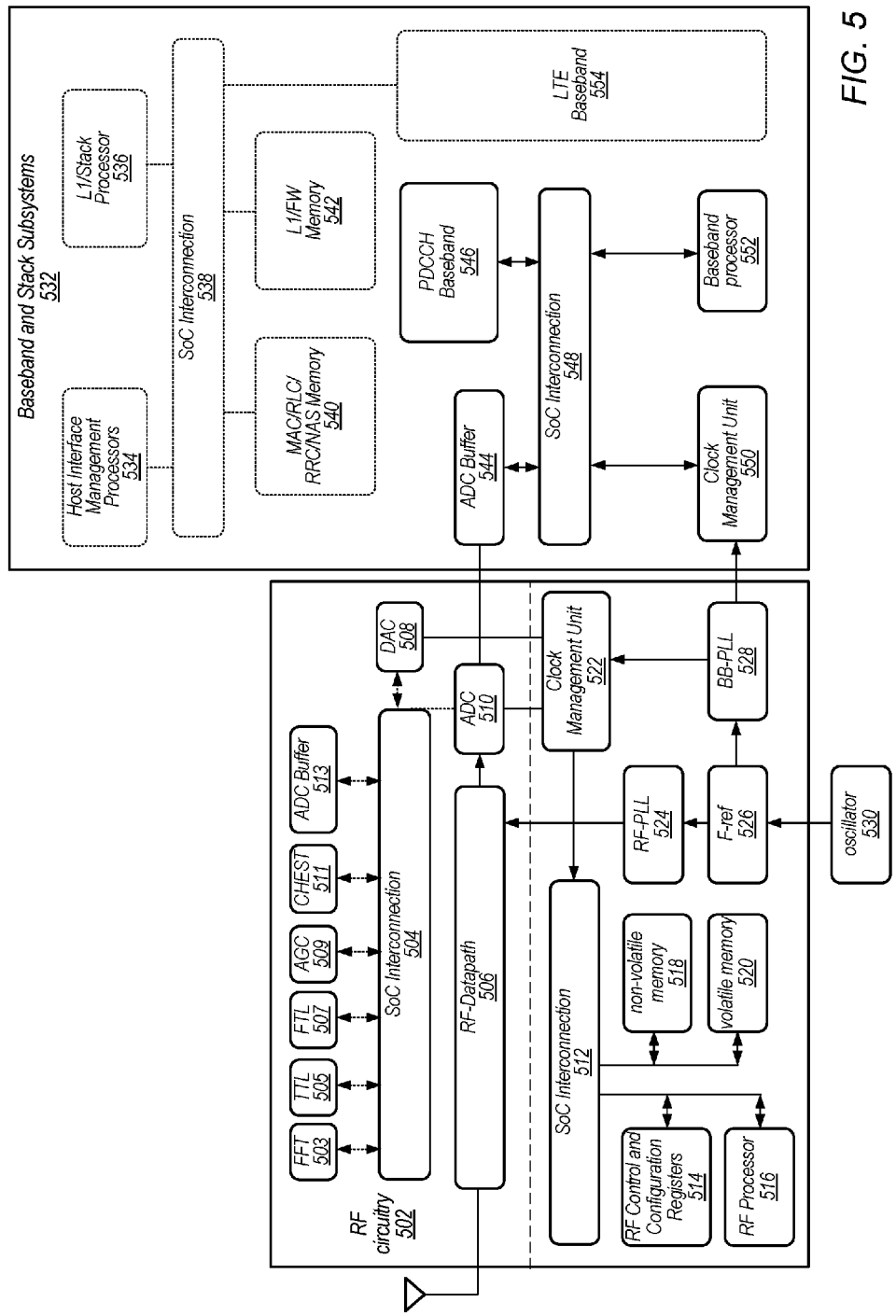
FIG. 5 is an example block diagram of wireless communication circuitry of a UE, according to one embodiment.

FIG. 5—Exemplary Wireless Communication Circuitry of a UE

FIG. 5 illustrates a block diagram of exemplary wireless communication circuitry of a UE, e.g., for performing cellular communication. In one embodiment, the wireless communication circuitry of FIG. 5 may correspond to at least a portion of the cellular radio 430 of FIG. 4. As shown, the UE includes both radio frequency (RF) circuitry (e.g., RF integrated circuit (IC)) 502 and baseband and stack subsystems 532 (also referred to as "baseband circuitry"). The UE also includes an oscillator 530, which may be a crystal oscillator.

As shown, the oscillator 530 may deliver F-ref 526. F-ref 526 may be the main reference frequency delivered by the oscillator 530 upon reaching its stable state. The oscillator 530 may be coupled to the RF-PLL (phase locked loop) 524 and the BB-PLL 528. The RF-PLL is the RF phase locked loop that may be used to deliver the reference clock for the RF-Datapath. The BB-PLL 528 is the baseband circuitry phase locked loop, which may be used to lock the reference clock for the baseband circuitry 532.

The RF-PLL is coupled to the RF-datapath 506, which is coupled to one or more antenna(s) (e.g., the antennas 435 and 436) as well as the ADC (analog to digital converter) 510. The RF-datapath 506 may include components used to prepare the signal to be transmitted/received by the antenna. The ADC may be used to convert from analog signal(s) to IQ-samples.

The BB-PLL 528 may be coupled to a clock management unit 522, which may be used to manage the different clocks rates delivered to the baseband/RF interface. The clock management unit 522 may be coupled to both the ADC 510 and the DAC (digital to analog converter) 508. The DAC 508 may be used to convert IQ-samples to analog signal(s). Both the ADC 510 and the DAC 508 may be coupled to the SoC interconnection 504. Additionally, FFT (fast fourier transform) 503, TTL (time tracking loop) 505, FTL (frequency tracking loop) 507, AGC (automatic gain control) 509, CHEST (channel estimation) 511, and ADC Buffer 513 blocks may be coupled to the SoC Interconnection 504. As discussed below, these blocks may allow the RF circuitry to prepare for PDCCH processing without assistance from the baseband circuitry.

The clock management unit 522 may also be coupled to the SoC interconnection 512, which may be coupled to the RF processor 516 (e.g., which may be referred to as the "RF microprocessor" below), the RF control and configuration registers 514, the non-volatile memory 518, and the volatile memory 520. The RF control and configuration registers may be registers used to control the work flow of the RF circuitry and to configure its different components. The SoC (System-on-Chip) interconnections may also be referred to as NoC (Network-on-Chip). These interconnections may be the bus system which is used so that the different components can communicate with each other according to a bus protocol. For example, this bus may be used when a processor requests memory words, memory responds with the request words, and so on. In one embodiment, while each SoC interconnection (e.g., 504, 512, 548, and 538) each have their own reference number, they may refer to a same system or functionality.

As discussed below, the RF processor 516 may control tasks required to prepare for reception (Rx) after waking up from sleep, e.g., instead of being controlled by the baseband processor 552. The non-volatile memory (or non-volatile RAM) 518, which may be implemented as flash memory, may store various settings, code, etc. while the RF circuitry 502 is in a sleep state. For example, the non-volatile memory may store the code, which is executed by the RF processor 516. The volatile memory 520 (or RAM) may be the memory used by the RF processor 516. For example, after waking up from a sleep state, the RF processor 516 may transfer the code and the data required for its operation from the non-volatile memory 518 to the volatile memory 520. At this point, the code may be executed by the RF processor 516. This process may be referred to as the boot process, e.g., of the RF circuitry 502.

As shown, the baseband and stack subsystems 532 include a variety of components. For example, the BB-PLL 528 of the RF circuitry 502 is coupled to the clock management unit 550 that may manage the different clock rates delivered to the baseband circuitry components. The clock management unit may be coupled to the SoC interconnection 548, which in turn may be coupled to the ADC Buffer 544, the PDCCH baseband 546, and the baseband processor 552. The PDCCH baseband 546 may be the baseband block configured to receive PDCCH. The ADC buffer 544 may store data from the ADC 510 (e.g., the IQ samples).

The baseband processor 552 (sometimes referred to as baseband microprocessor) may generally be used to control the signal processing data path (transmission(Tx)/reception (Rx)). The baseband processor 552 may be used as the global scheduler for activities that are performed on the antenna. If there is not an RF processor, then the baseband processor 552 may be used to schedule the RF circuitry activities as well.

The SoC interconnection 548 may be coupled to the host interface management processor 534, the L1/Stack processor 536, the MAC/RLC/RRC/NAS memory 540, the L1/FW memory 542, and the LTE baseband 554. The host interface management processor 534 may be used the application processor(s) used for user interface, graphical processor, and others. The L1/Stack processor 536 may be the processor devoted for the code of LTE-stack and L1-control. The MAC/RLC/RRC/NAS memory 540 may be the memory used by the layers MAC, RLC, RRC, and NAS components. The L1/FW memory 542 may be the memory used by L1-driver and the Firmware. Finally, the LTE baseband 554 may be the baseband block configured to perform the LTE signal processing required to serve the physical channels, e.g., except PDCCH.

Exemplary Wakeup Process Embodiments

During operation, the UE 106 may periodically enter and exit sleep states. For example, the UE 106 may periodically enter a sleep state to conserve battery power and may wake up from the sleep state to receive messages from the network, e.g., to perform PDCCH reception, among other possibilities. The following embodiments may be implemented using one or more of the systems or devices described above, as desired.

In a first embodiment, the wake up process may involve one or more of the following steps:
1) turning on a crystal oscillator of the UE (also referred to as "XO", although other oscillators are also envisioned) and waiting for the XO to stabilize;
2) providing the output of the XO (or reference frequency) to various different PLLs, e.g., of the RF circuitry;
3) clocks may be provided, e.g., using the output of the PLLs, to various portions of the wireless circuitry, e.g., the RF circuitry and/or baseband circuitry, such as to microprocessors, memories, etc. of the wireless circuitry; and
4) various wakeup code sequence(s) may be executed.

An exemplary wakeup code sequence may include one or more of the following steps:
1) Calibration of a fast clock (e.g., the master clock used for cellular communication in the wireless communication circuitry) with a slow clock of the UE. The slow clock may be a clock that is always on in the UE, e.g., which may operate in a range around 32 kHz (e.g., only 32 kHz), and the fast clock may be a clock that is periodically on (e.g., when outside of sleep states), e.g., which may operate in a range around 20 MHz to 1.5 GHz (although other frequency ranges are possible). The fast clock may be derived from the XO/PLLs discussed above. The calibration of the fast clock may involve determining how many cycles of the fast clock have passed since it was last running, based on the number of cycles of the slow clock. In particular, since the time the fast clock was stopped, there may have been n slow clock cycles, which may be converted to m fast clock cycles, based on the ratio of the frequencies of the cycles of the two clocks. Accordingly, the fast clock may be "caught up" to a current cycle by calculating the number (m) of fast clock cycles that have passed since it was last on;
2) restoring the state of the baseband subsystem (e.g., specific registers, memory, software, firmware, etc.). This step may involve loading data stored in non-volatile memory to volatile memory for use, e.g., for performing cellular transmission/reception;
3) calibrating the RF circuitry; and
4) preparing the PDCCH reception process, e.g., including frequency tracking loop (FTL) and time tracking loop (TTL) processes, automatic gain control (AGC), channel estimation (CHEST), etc. The PDCCH preparation process may take approximately 1 ms.

Upon completion of the wake up process, the PDCCH (or other messages from the network) may be received and the UE/wireless circuitry may operate in normal mode.

Figure 6:
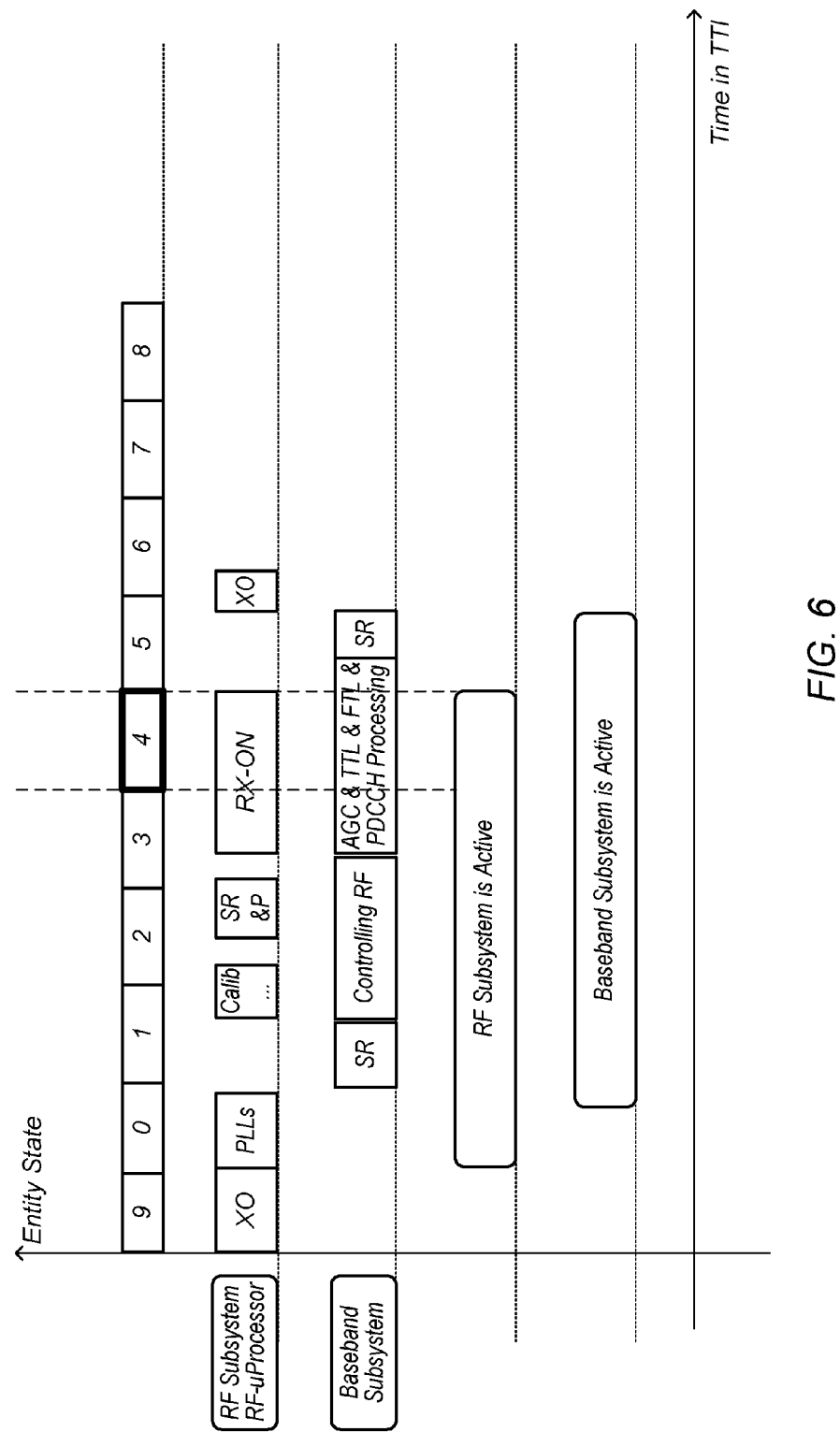
FIGS. 6 and 7 illustrate timing diagrams of embodiments of wakeup processes.

FIG. 6 illustrates an exemplary timing diagram corresponding to this first embodiment. As shown, the timing of the diagram is shown in periodic 0-9 transmission time intervals (TTIs) (e.g., each being 1 ms), starting with TTI 9. In this particular example, the PDCCH is received in the TTI 4, as indicated by the dotted lines. In TTI 9, the XO may be initially turned on, e.g., to provide the reference frequency for the system, e.g., the wireless communication circuitry. This process may take 1 ms to stabilize. During this step, only the RF circuitry may be active, as shown.

During TTI 0, the PLLs (e.g., of the RF circuitry) may be initiated, using the output of the XO. In particular, the PLLs may be programmed to drive RF and baseband circuitry with the appropriate frequencies. During this step, only the RF circuitry may be active, as shown.

After the PLLs, state retention algorithms may be initiated by the baseband system at the end of TTI 0. The state retention algorithms may involve transfers of various states from non-volatile memory (e.g., stored prior to entering the sleep state) to volatile memory, and may involve memory, registers, software modules, etc. During this step, both the RF and the baseband circuitry may be active, as shown.

In TTI 1, calibration and initiation of the RF circuitry may be performed. During this step, both the RF and the baseband circuitry may be active, as shown. Additionally, in this embodiment, the baseband circuitry (e.g., the baseband processor) may control the RF circuitry to perform the calibration.

Then, in TTI 2, state retention and programming is performed for the RF circuitry (e.g., for reception of the PDCCH). In this embodiment, the state retention of both the baseband circuitry and the RF circuitry may be controlled by the baseband circuitry, e.g., transfers of tables and program code from non-volatile memory for both the RF circuitry and the baseband circuitry may be initiated and/or controlled by the baseband circuitry. State retention step(s) may be referred to as "state restoration" step(s) when restoring previous state information. During this step, both the RF and the baseband circuitry may be active, as shown.

At this point, in TTIs 3-4, the baseband circuitry may perform AGC, TTL, FTL, CHEST, and PDCCH processing. The AGC, TTL, and FTL are control loops which may be initiated before the actual reception, e.g., of the PDCCH. In some embodiments, they may require 0.5 ms to converge. After convergence, PDCCH reception (e.g., by RF circuitry) and processing (e.g., by baseband circuitry) may be performed. During this step, both the RF and the baseband circuitry may be active, as shown.

Upon completion of the PDCCH processing, in TTI 4-5, state retention is performed by the baseband circuitry, in preparation of XO shut down. For example, the baseband circuitry (e.g., the baseband processor) may initiate transfer current state information (e.g., tables and code) from volatile memory to non-volatile memory. During this step, only the baseband circuitry may be active, as shown.

Finally, at TTI 5-6, the XO may be switched off, and a new sleep state may be entered, e.g., until the process is performed again, such as for the next PDCCH. During this step, only the baseband circuitry may be active, as shown.

In this first embodiment, the RF circuitry may include a microprocessor (e.g., such as the microprocessor shown in FIG. 5), which may be involved in performing the calibration process, or more generally, to distribute and localize functionalities to the RF circuitry. However, in this embodiment, the transition time from XO shut down state to the reception of PDCCH may be longer and may consume more power than is desirable.

In a second embodiment, because the transition from XO shut down state to the reception stage is longer than desired, the XO may simply remain on, and only be shut down in rare circumstances. However, even more so than the first embodiment, the power consumption in this embodiment may be undesirable.

In a third embodiment, e.g., which may improve on the steps of the first embodiment and upon the power consumption of both the first and second embodiments, the wake up sequence may be parallelized and some functions of the baseband circuitry (e.g., stripped down versions of these functions) may be shifted to the RF circuitry, e.g., by using the microprocessor of the RF circuitry.

In particular, a small and power efficient microprocessor may be included in the RF circuitry. The task of this microprocessor may include scheduling the wake up sequence of the RF circuitry. In addition, NVRAM and SRAM may also be included in the RF circuitry, e.g., to retain the state of the RF circuitry in both sleep and active modes. Accordingly, in the third embodiment, the RF state retention steps may be moved from the baseband circuitry (e.g., the baseband processor) to the RF microprocessor (e.g., frequency parameters, AGC values, etc.). Additionally, the transfer or control of calibration tables and sequences may be switched from the baseband processor to the RF microprocessor. Additionally, one or more of the AGC, FTL, TTL, or CHEST functions may be performed by the RF circuitry rather than the baseband circuitry, e.g., using the blocks 503, 505, 507, 509, 511, or 513, shown in FIG. 5. Further discussions of this functionality are provided below.

Figure 7:
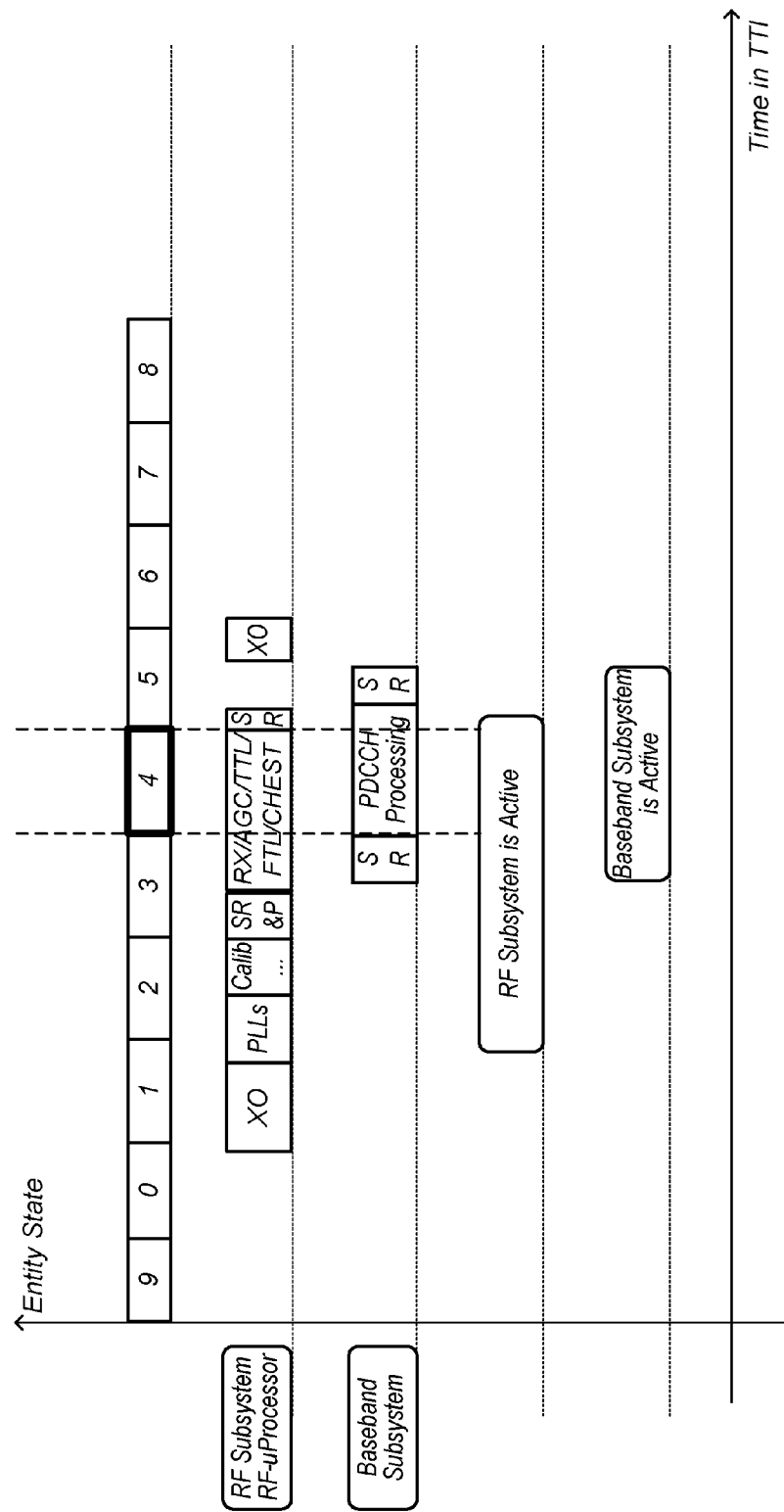
Figure 9:
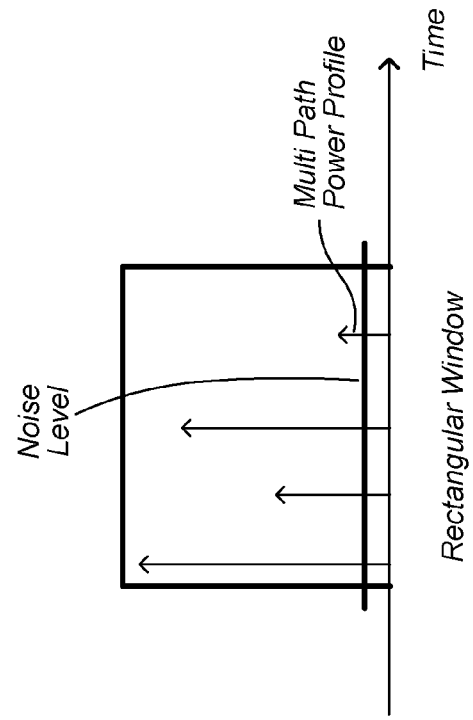
FIGS. 8 and 9 illustrate exemplary windows which may be used in channel estimation, according to one embodiment.

FIG. 7 illustrates a similar timing diagram as FIG. 6, except adjusted for the operation of the third embodiment. In particular, the waiting period in the RF circuitry (between TTI 0 and 1 in FIG. 6) may be removed by configuring the RF microprocessor to control the calibration and state restoration processes of the RF circuitry. In one embodiment, the state restoration process of the RF and baseband circuitries can thereby be made independent. As shown, the RF circuitry is no longer dependent on waiting for the state restoration steps of the baseband circuitry before beginning calibration, and thus may operate independently of the baseband circuitry and/or its processor. Instead, the RF circuitry (e.g., the microprocessor of the RF circuitry) may begin calibration immediately after the PLL step. Additionally, the state restoration process of the baseband circuitry can now be moved to immediately prior to PDCCH processing of the baseband circuitry at TTL 4, allowing the baseband circuitry to both shorten its execution time and begin at a later time. Because the state restoration "gap" of the RF circuitry has been removed, the XO may be started later than in the first embodiment, which also provides power savings. Further, a new state retention step has been added to the RF circuitry so that it can retain its state independently from the baseband circuitry. By doing its own retention, the RF circuitry can go to sleep prior to completion of PDCCH processing, which further reduces power consumption and the active state length of the RF circuitry.

By implementing the third embodiment, the wake up process may be improved by several TTI, e.g., as compared to the first embodiment. In particular, in the third embodiment, the baseband circuitry may only be switched on directly prior to the PDCCH reception. Therefore, the power consumption may be reduced by about 1.8 ms to 2 ms (during this period the baseband subsystem is inactive/in sleep mode). This power savings may be enabled by the RF microprocessor.

RF Circuitry PDCCH Preparation

As discussed above, the RF circuitry, e.g., using a processor of the RF circuitry, may perform various additional tasks that may normally have been performed or controlled by baseband circuitry.

In particular, in one embodiment, the RF circuitry may have a processor that may control one or more of: calibration tables which are stored inside the RF circuitry instead of the baseband circuitry and transferring those tables through the interface, scheduling the activities of the wake-up sequence, scheduling the activities required to receive the PDCCH, and/or retaining the state of the RF circuitry registers and programming them. In addition, the RF circuitry may include, e.g., adapted and stripped-down versions of, the following baseband circuitry components: ADC-buffer to enable storing the IQ samples, AGC to enable adjusting the signal level, CHEST adapted to the case of PDCCH and the loops, TTL to enable correcting the time, FTL to enable correcting the frequency, and/or FFT to enable the functionality of frequency-based estimation (RS symbols in the frequency domain). Thus, in one embodiment, all of the preparation for receiving the PDCCH may be performed in the RF circuitry. Accordingly, the baseband circuitry with all its infra-structure (processor, memories, busses, etc.) may wake up just prior to the TTI where the PDCCH is sent.

By following this embodiment, the RF circuitry may be on for only 4.2 ms, which is ca. 30% power optimized relative to the schedule shown in FIG. 6. This savings may result from the processor included in the RF circuitry performing its activities independently of the baseband processor and due to no wait time for the requests and/or response actions. Additionally, the baseband circuitry may only be active for approximately 2 ms which is ca. 50% power optimized relative to the schedule of FIG. 6 because preparation for the PDCCH reception may be handled by the RF circuitry and there may be no need to switch on the baseband circuitry before the PDCCH TTI to perform the loops AGC, TTL, FTL, etc.

The described embodiments may provide the following power saving factors. For example, the RF circuitry may become an independent module where most or all of its tasks are programmed inside the RF circuitry without any wait states for the tasks to be programmed by the baseband circuitry (e.g., the baseband processor). As mentioned above, this may allow approximately 30% of the power consumed in the RF circuitry to be saved. Additionally, the described embodiment may not require DMA or system buses for transferring huge chunks of data from the baseband circuitry to the RF circuitry since most or all of the data may be stored locally in the NVR and memory inside the RF circuitry. Furthermore, the baseband circuitry may be switched on approximately 0.5 ms before the PDCCH-TTI where the PDCCH state retention and programming allow the baseband circuitry to receive the PDCCH. This schedule saves approximately 50% of the power consumed in the baseband circuitry.

The described embodiments may implement or use a simple system component architecture. For example, there may be very low communication between the RF circuitry and the baseband circuitry, which it leads to simplification of their interfaces as well as localization of bugs and optimization. Additionally, the RF circuitry may implement very specific and simple algorithms to perform AGC, TTL, FTL, CHEST, and FFT to serve the PDCCH reception. In one embodiment, these algorithms may be adapted for this use case independent of the same general versions existing in the baseband circuitry to serve all the physical channels in the baseband circuitry. The buffers size used in the RF circuitry for these algorithms may be limited, e.g., approximately 25% of the size of the buffer used in the baseband circuitry. Additionally, only OFDM symbols containing RS symbols in frequency domain may be processed (by the FFT and subsequently by the other blocks, e.g., AGC, TTL, FTL, CHEST, etc. by the RF circuitry. Further, local patches for the RF circuitry tasks can be easily added because there may be a dedicated processor with its corresponding memories. Finally, RF circuitry local debugging may now be possible by having a processor in the RF circuitry that allows for connecting to a hardware debugger.

Additional RF Circuitry Algorithms

In LTE and other wireless systems, the channel estimation (CE or CHEST), time tracking loop (TTL), and frequency tracking loop (FTL) are important to the modem's physical layer (PHY) receiver processing to correctly demodulate the transmitted signal. LTE and other wireless systems exploit the idea of discontinuous reception (DRX) to provide power saving when the traffic activity is low or bursty or periodic such as VoLTE. After a sleep period, CHEST and PHY loops needs to be resumed gracefully (i.e., converge to accurate values) in order to minimize performance degradation. However, as discussed above, these processes should ideally be resumed quickly (i.e., converge quickly) in order to minimize power consumption. In real systems, there is a tradeoff between convergence and accuracy. This tradeoff should be exploited to ensure correct PDCCH decoding (e.g., in LTE) but done as quickly as possible.

The convergence rate of CE and PHY loops will determine the amount of time the UE is awake during PDCCH decoding. This amount of time may be of high importance in cases where no DL grant is assigned to the UE, e.g., where the UE would go to sleep after PDCCH decoding (and seeing no grant assigned to it).

Typical channel estimation algorithms for OFDM systems have 2 components: time domain channel tracking/interpolation and frequency domain tracking/interpolation. The aim of the frequency domain tracking/interpolation is to smooth the noise in the frequency domain and to find the channel estimates for the subcarriers that do not contain reference symbols or pilots. This can be achieved either through filtering in the frequency domain or windowing in the time domain. The optimal window/filter is based on the noise and the delay spread estimates. However after a C-DRX sleep period, these quantities might not be available at the PHY.

Figure 8:
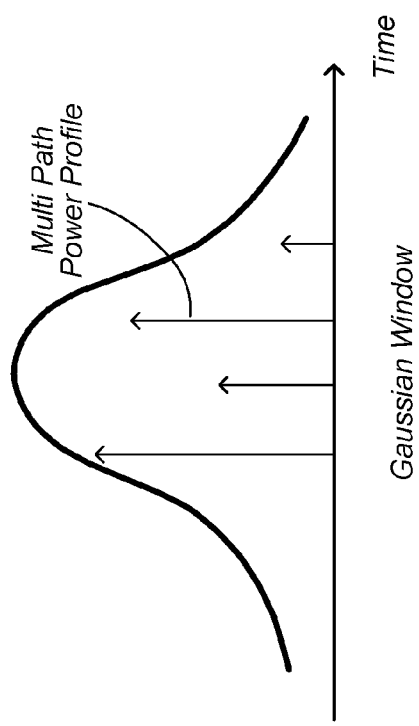

In order to minimize the latency of the CHEST, a robust window/filter may be used. The latter will cover most scenarios but might be tailored towards the most challenging scenarios such as low SNR (signal to noise ratio) and medium to high delay spread. Examples of robust windows are shown in FIGS. 8 (Gaussian) and 9 (rectangular). The filter in the frequency domain may be obtained by taking an FFT of that particular window. Time tracking of CHEST may be performed by smoothing the channel in the time domain direction and interpolating the CHEST for OFDM symbols that do not contain channel estimation. The time tracking filter may depend on the noise estimate and the Doppler estimate.

PDCCH in LTE includes up to the first 4 OFDM symbols of a subframe in LTE, though typically it is either 2 or 3 OFDM symbols. The RS symbols may be located in OFDM symbol 0 and 4. The PDCCH may contain the control information regarding the grant allocation in the downlink (DL), i.e., PDSCH (physical downlink shared channel) scheduling. If no control information intended to the UE is found, then the UE can go to sleep for the rest of the subframe of length 1 ms (1 subframe contains 14 OFDM symbols for short cyclic prefix format).

In a first embodiment, in order to reduce the latency of CHEST, and as a consequence the latency of PDCCH decoding, the following approach is taken:

Depending on the noise estimate, e.g., if the SNR<Th1 then time tracking may use OFDM symbol 0 and 4 to generate the channel estimates. Otherwise, if SNR>Th1, then time tracking may be disabled and only OFDM symbol 0 may be used to generate channel estimates. The same channel estimates generated for OFDM symbol 0 may be reused for OFDM symbol 1 to potentially 4. In order to reduce the latency of CHEST, a one-shot Doppler estimate (from the reference signal (RS) in OFDM symbol 0) or previous Doppler estimate from the previous ON period in a C-DRX may be used. This Doppler estimate may only be needed in the case where SNR<Th1. It is assumed that a noise estimate is available at the PHY layer. As an example, Th1 may equal 4 dB.

In a second embodiment, e.g., for the FTL/TTL/AGC discussed above, a simpler CHEST may be used. For example, after extracting the RS symbols, a least squares (LS) estimate may be generated. This estimate may then be provided to a low pass filter to smooth the noise. This filter may not perform any interpolation (based on delay spread), but may only act as a smoothing filter. This process may be used as a basis for all the loops.

Figure 10:
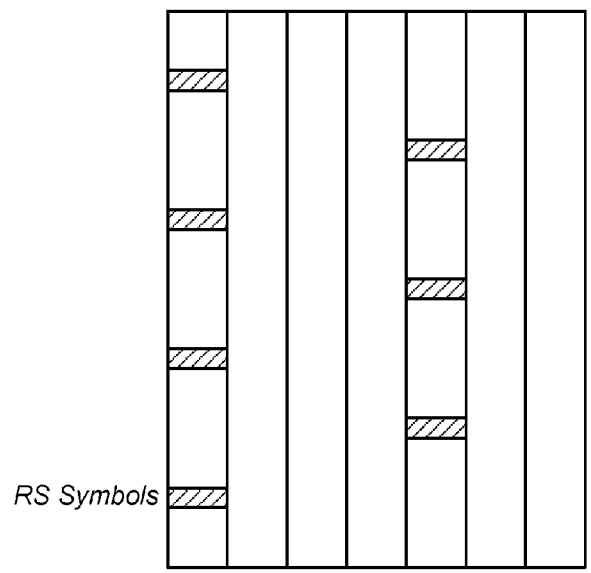
FIG. 10 illustrates an exemplary illustration of OFDM symbols, according to one embodiment.

FIG. 10 illustrates an exemplary set of symbols including the RS symbols in OFDM symbols 0 and 4. In this diagram RS symbols are shown as black rectangles within the illustrated 7 slots. Each slot represents 0.5 ms or 1 OFDM symbol. Additionally, or alternatively to the second embodiment, the RF circuitry may operate as follows. RS symbols may be extracted only in the middle of the band. For example, for 10 MHz LTE, there are 100 RS per transmit antenna in an OFDM symbol. Accordingly, only 50 RS may be extracted, e.g., corresponding to the center 5 MHz. Thus, RF circuitry may only need to receive and/or process for 5 MHz, which leads to power saving. In this embodiment, only OFDM symbols 0 and 4 may be used. TTL may only require 1 OFDM symbol (e.g., 0) and FTL may only require 2 OFDM symbols (e.g., 0 and 4) because of the cross correlation. If needed, the processing of FTL/TTL/CHEST can span multiple subframes or slots. Time domain processing may not require FFT, and loops can be based on cyclic prefix and PSS/SSS (primary/secondary synchronization signals).

The RF circuitry may be configured to implement one or more of the embodiments discussed above. Alternatively, the first embodiment may be implemented in baseband circuitry while the further embodiment(s) may be implemented in RF circuitry.

The main tracking loops used in a baseband receiver are a time tracking loop that corrects residual timing offset and a frequency tracking loop that corrects frequency offset. AGC is also used to correct for the gain. These 2 loops use the RS symbols to detect a timing error or a frequency error or a power gain (even if the latter can also be deduced from the time domain samples). Then these errors are averaged and tracked by a loop filter before correcting the samples received in baseband circuitry. Averaging and tracking means there is a time constant for each loop. The time constant is dependent on the amount of averaging and on the loop filter. The time constant of the loop is the time needed for the loop to converge and for the residual error to become negligible. Typically it is desirable that such loops have converged before demodulating the baseband signal.

Figure 11:
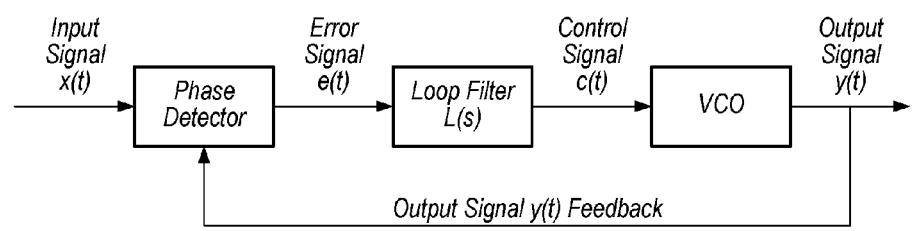
FIG. 11 illustrates an exemplary block diagram of a timing loop, according to one embodiment.

However, in a third embodiment, to reduce the latency of decoding, it is proposed to fasten the tracking loops. In particular, in the third embodiment, the gain of the tracking loops is increased. In addition, a single shot estimate of the frequency/time offset/gain may be produced. The gain/time offset may be estimated from the first OFDM symbol without averaging of these quantities. FIG. 11 provides an exemplary block diagram of a tracking loop, where an input signal is provided to a phase detector, which produces an error signal that is provided to a loop filter, which produces a control signal that is provided to a VCO that produces an output signal, which may be provided back as feedback to the phase detector. In this example, the frequency offset may need OFDM symbols 0 and 4 to compute a cross-correlation.

Figure 12:
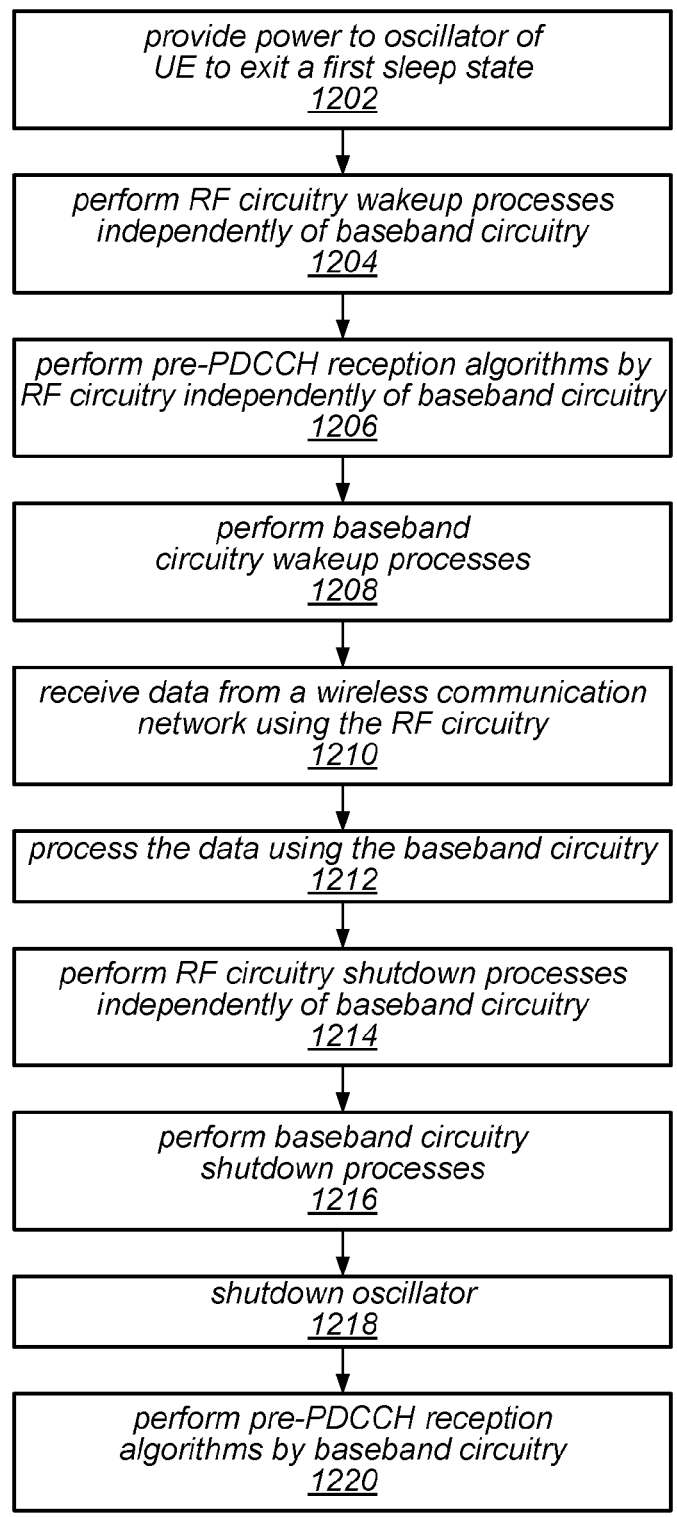
FIG. 12 is a flowchart diagram illustrating an exemplary method for performing PDCCH preparation in radio frequency (RF) circuitry, according to one embodiment.

FIG. 12—PDCCH Preparation in RF Circuitry

FIG. 8 is a flowchart diagram illustrating a method for PDCCH preparation in RF circuitry. The method may be performed by a UE device (such as UE 106), e.g., using the systems and methods (such as the third embodiment) discussed above. More generally, the method shown in FIG. 8 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 1202, an oscillator (e.g., a crystal oscillator) may enter an active state from a sleep state. In one embodiment, the oscillator may have been powered off in the sleep state and 1202 may include powering on the oscillator.

In 1204, RF circuitry may perform wakeup processes independently from the baseband circuitry. For example, a reference signal of the oscillator may be provided to one or more phase locked loops (PLLs) of the RF circuitry. These PLLs may in turn provide outputs that may be used to drive one or more clocks of the RF circuitry and/or the baseband circuitry. The RF circuitry may calibrate and initialize various RF circuitry components. Additionally, the RF circuitry may perform state restoration processes, e.g., which may involve transferring state information (e.g., of registers, memory, software, firmware, etc.) from non-volatile memory to volatile memory of the RF circuitry. The RF circuitry may transfer various tables or other data (e.g., calibration tables and sequences, frequency parameters, AGC values, etc.), code for execution by the microprocessor of the RF circuitry, etc. as part of the state information and/or as another process in the wakeup processes.

As discussed above, one or more of the wakeup processes may be controlled by the microprocessor of the RF circuitry. That is, instead of the baseband circuitry initiating and/or controlling state restoration processes, they may be initiated and/or controlled by the RF circuitry instead (e.g., the microprocessor of the RF circuitry). In particular, in one embodiment, the state restoration processes may be performed independently from the baseband circuitry.

In 1206, the RF circuitry may perform various pre-PDCCH reception algorithms, such as AGC, TTL, FTL, CHEST, and/or FFT, in preparation of receiving the PDCCH. These algorithms may be implemented by the RF circuitry and may be independent from the baseband circuitry. In fact, the baseband circuitry may not be awake when these algorithms are initiated. As discussed above, these algorithms may be scaled-down or simplified versions of typical, more generalized, AGC, TTL, FTL, CHEST, and/or FFT algorithms that are implemented by the baseband circuitry, e.g., in order to allow PDCCH reception to be performed more power efficiently. The specifics of such algorithms were discussed previously.

In 1208, e.g., after initiation of the pre-PDCCH reception algorithms of 1206, the baseband circuitry may perform wakeup processes. Similar to the RF circuitry, the baseband circuitry may perform state restoration processes, e.g., involving transferring of state information (e.g., of registers, memory, software, firmware, etc.) from non-volatile memory to volatile memory.

The wakeup processes of the baseband circuitry and/or the RF circuitry may include calibrating a fast clock of the UE with a slow clock of the UE. As discussed above, the UE may have a slow clock that is always on, or at least was one during the first sleep state, which may operate at a slower rate than the fast clock, which may be used as a clock of the wireless communication circuitry (e.g., which is used in performing communication with the wireless communication network). The slow clock may operate in a range near 32 kHz while the fast clock may operate in a 20 MHz to 1.5 GHz range. The slow clock may be powered separately from the main components of the UE. The fast clock may be based on the output of the PLLs discussed above. The calibration of the fast clock may involve determining how many fast clock cycles have passed while in the first sleep state (e.g., since the last active state or clock stored in the state information). In one embodiment, this determination may be performed by determining the number of slow clock cycles that have passed in that time and converting the slow clock cycles to fast clock cycles. Accordingly, the current fast clock cycle may be determined by determining the number of slow clock cycles that have passed. Thus, a current fast clock time or cycle may be determined, which may be necessary for successfully receiving data from the wireless communication network (e.g., identifying the current TTI and scheduling reception at the proper TTI).

In 1210, data may be received from the wireless communication network using the RF circuitry. In one embodiment, the data may be data provided within the physical downlink control channel (PDCCH), i.e., may be PDCCH information. The data may be received after performing the processes of the baseband circuitry (e.g., FTL/TTL processes).

In 1212, the data may be processed by the baseband circuitry. For example, the baseband circuitry may process the PDCCH information received by the RF circuitry.

In 1214, the RF circuitry may perform shutdown processes independently from the baseband circuitry. For example, the RF circuitry may initiate these shutdown processes prior to completion of processing of the received data. The shutdown processes may involve state retention processes, e.g., transferring information from volatile memory to non-volatile memory, in preparation for a next sleep state. The state retention processes are generally the same processes, but in the opposite direction, of the state restoration processes discussed above in 1204.

In 1216, the baseband circuitry may perform shutdown processes. For example, the baseband circuitry may perform state retention processes, e.g., transferring information from volatile memory to non-volatile memory, in preparation for the next sleep state. The state retention processes are generally the same processes, but in the opposite direction, of the state restoration processes discussed above in 1208.

In 1218, after the shutdown processes of 1216, the oscillator may enter a sleep state.

At a later point, in 1220, the baseband circuitry may perform its own AGC, TTL, FTL, CHEST, and/or FFT algorithms, which may be more complex or more generalized than those implemented by the RF circuitry and discussed in 1206 above.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs. For example, some or all of the units included in the UE may be implemented as ASICs, FPGAs, or any other suitable hardware components or modules.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for controlling radio frequency (RF) circuitry and baseband circuitry of a user equipment device (UE), wherein the apparatus comprises:
   one or more processing elements, wherein the one or more processing elements are configured to:
     exit a first sleep state;
     initiating and performing at least one algorithm to prepare for receiving data from a wireless communication network, wherein the at least one algorithm is performed by the RF circuitry independent of baseband circuitry of the UE;
     after initiating the at least one of algorithm, perform state restoration of the baseband circuitry;
     receive the data from the wireless communication network using the RF circuitry;
     process the data using the baseband circuitry;
     perform state retention for the RF circuitry and the baseband circuitry; and
     enter a second sleep state.

2. The apparatus of claim 1, wherein the at least one algorithm comprises frequency tracking loop (FTL), time tracking loop (TTL), and channel estimation (CHEST) algorithms.

3. The apparatus of claim 2, wherein the baseband circuitry also implements FTL, TTL, and CHEST algorithms, wherein the FTL, TTL, and CHEST algorithms implemented by the RF circuitry are simplified as compared to the FTL, TTL, and CHEST algorithms implemented by the baseband circuitry.

4. The apparatus of claim 2, wherein the at least one algorithm comprises automatic gain control (AGC).

5. The apparatus of claim 1, wherein the at least one algorithm comprises a channel estimation algorithm, wherein the channel estimation algorithm comprises:
   extracting reference symbols;

performing a least squares estimate using the reference symbols; and performing a low pass filter using the least squares estimate, wherein the low pass filter does not comprise interpolation.

6. The apparatus of claim 1, wherein the at least one algorithm comprises a channel estimation algorithm, wherein the channel estimation algorithm comprises extracting reference signals, wherein the reference symbols are extracted from a middle portion of a band.

7. The apparatus of claim 1, wherein performing state retention for the RF circuitry and the baseband circuitry comprises:

performing state retention of the RF circuitry independent of the baseband circuitry, wherein said performing state retention of the RF circuitry independent of the baseband circuitry is performed prior to completion of processing of the data using the baseband circuitry; and performing state retention of the baseband circuitry after processing the data.

8. The apparatus of claim 1, wherein the data comprises physical downlink control channel (PDCCH) information.

9. An apparatus for controlling radio frequency (RF) circuitry of a user equipment device (UE), wherein the apparatus comprises:

one or more processing elements, wherein the one or more processing elements are configured to cause the RF circuitry to:

exit a first sleep state;

in response to exiting the first sleep state, perform a plurality of algorithms to prepare for receiving control information from a wireless communication network, wherein the plurality of algorithms are performed independent of baseband circuitry of the UE;

receive the control information from the wireless communication network; and perform state retention of the RF circuitry after receiving the control information from the wireless communication network, wherein state retention of the RF circuitry is performed independent of the baseband circuitry of the UE.

10. The apparatus of claim 9, wherein the plurality of algorithms comprise frequency tracking loop (FTL), time tracking loop (TTL), and channel estimation (CHEST) algorithms.

11. The apparatus of claim 10, wherein the baseband circuitry also implements FTL, TTL, and CHEST algorithms, wherein the FTL, TTL, and CHEST algorithms implemented by the RF circuitry are simplified as compared to the FTL, TTL, and CHEST algorithms implemented by the baseband circuitry.

12. The apparatus of claim 9, wherein the plurality of algorithms comprise a channel estimation algorithm, wherein the channel estimation algorithm comprises:

extracting reference symbols;

performing a least squares estimate using the reference symbols; and performing a low pass filter using the least squares estimate, wherein the low pass filter does not comprise interpolation.

13. The apparatus of claim 9, wherein the plurality of algorithms comprise a channel estimation algorithm, wherein the channel estimation algorithm comprises extracting reference signals, wherein the reference symbols are extracted from a middle portion of a band.

14. The apparatus of claim 9, wherein the one or more processing elements are further configured to:

perform calibration and state restoration of the RF circuitry independent of the baseband circuitry;

wherein said performing state retention of the RF circuitry independent of the baseband circuitry is performed prior to completion of processing of the control information using the baseband circuitry.

15. The apparatus of claim 9, wherein the control information comprises physical downlink control channel (PDCCH) information.

16. Radio frequency (RF) circuitry configured for placement within a user equipment device (UE), wherein the RF circuitry comprises:

a microprocessor;

non-volatile memory coupled to the microprocessor, wherein the non-volatile memory is configured to store state information while in a sleep state;

volatile memory coupled to the microprocessor, wherein the volatile memory is configured to store state information while in an active state;

wherein the RF circuitry is configured to:

perform state restoration of the RF circuitry using the non-volatile memory in response to exiting a first sleep state;

perform at least one algorithm to prepare for receiving data from a wireless communication network, wherein performing the at least one algorithm is controlled by the microprocessor of the RF circuitry;

receive the data from the wireless communication network; and perform state retention of the RF circuitry after receiving the data from the wireless communication network, wherein performing state retention of the RF circuitry is controlled by the microprocessor of the RF circuitry.

17. The RF circuitry of claim 16, wherein the at least one algorithm comprises frequency tracking loop (FTL), time tracking loop (TTL), and channel estimation (CHEST) algorithms.

18. The RF circuitry of claim 17, wherein baseband circuitry of the UE also implements FTL, TTL, and CHEST algorithms, wherein the FTL, TTL, and CHEST algorithms implemented by the RF circuitry are simplified as compared to the FTL, TTL, and CHEST algorithms implemented by the baseband circuitry.

19. The RF circuitry of claim 16, wherein said performing state retention of the RF circuitry is performed prior to completion of processing of the data by baseband circuitry.

20. The RF circuitry of claim 16, wherein the data comprises physical downlink control channel (PDCCH) information.

* * * * *